May 5, 1970   E. M. JACOBUS   3,510,155
SWIVEL FITTING
Filed March 4, 1968

INVENTOR.
EDGAR M. JACOBUS

United States Patent Office 3,510,155
Patented May 5, 1970

---

3,510,155
SWIVEL FITTING
Edgar M. Jacobus, 2892 Salmon Drive,
Los Alamitos, Calif. 90720
Filed Mar. 4, 1968, Ser. No. 710,144
Int. Cl. F16l *17/00, 27/00*
U.S. Cl. 285—98                                   9 Claims

ABSTRACT OF THE DISCLOSURE

A swivel fitting having relatively rotable portions defining a fluid leakage path within which are disposed a pair of axially spaced seals to prevent leakage across the leakage path and to align the rotatable portions for minimizing frictional resistance to their relative rotation.

BACKGROUND OF THE INVENTION

Field of the invention

The invention relates generally to fittings adapted to swivel relatively easily under pressure.

Description of the prior art

Swivel joints or fittings are widely used in hydraulic and pneumatic systems to permit relative movement. Truck brake systems, for example, include swivel fittings which enable swiveling movement of the brake lines extending between the sprung and unsprung portions of the vehicle. Many other and considerably more sophisticated applications exist, such as in the aerospace industry, where system pressures frequently exceed 2000 pounds per square inch gauge.

In existing swivel joints the relatively rotatable portions of the swivel fitting usually experience an axial separation or movement away from each other when they are subjected to the operating pressure differential. This separation tends to cause certain areas of the fitting to be forcibly pressed together. Consequently, the torque required to effect swiveling increases as the pressure differential increases. This is highly undesirable since it means the fitting will become progressively less able to swivel. This difficulty is further aggravated when the fitting is subjected to extremes in temperature.

A high pressure differential often also results in relative lateral movement of the fitting parts, that is, movement in a direction other than in a purely axial direction. This is also not desirable since it rocks the parts and causes them to bind and gall.

Prior art swivel fittings designed to obviate the difficulties just mentioned have been notably unsuccessful. They are either too complex, heavy, or costly. Most leak on initial turn-on of the associated system or they require unduly high torques under high pressure conditions.

SUMMARY

According to the present invention, a swivel fitting is provided which utilizes high pressure differentials to achieve essentially zero-leakage sealing, proper alignment of the swivel parts, and minimization of those areas which are frictionally engaged during swiveling.

The present swivel fitting includes complemental annular surfaces which are rotatable relative to each other during swiveling. These surfaces define a fluid leakage path. During operation of the swivel fitting a pressure is developed across the leakage path which is generally higher than the outside pressure for most applications, but the pressure differential could be just the opposite, as in vacuum lines.

The leakage path is provided with a pair of annular chambers or recesses which are spaced apart along the axis of the swivel fitting to receive a pair of seals. The innermost or front seal is preferably made of a material having a low coefficient of friction, while the outer or rear seal is primarily characterized by low resistance to deformation. With this arrangement, pressure in the swivel causes the rear seal to deform and block any leakage past the front seal so that a condition of zero-leakage is provided. The sealing of the rear seal allows a pressure differential to build up across the leakage path and this has the effect of pulling the swivel parts away from each other. This in turn has the effect of causing the opposite faces of the front seal to be engaged by the swivel parts so that the front seal serves not only as a seal but also as the bearing area for the swiveling movement. The front seal can also be made to coaxially align the swivel parts when they both engage the front seal.

The frictional resistance to relative rotation between the swivel parts is minimized because of the low coefficient of friction of the material of which the front seal is made. In certain applications an additional bearing seal can also be provided in the rear or outermost seal chamber to afford a bearing area similar to that provided by the front seal.

The foregoing as well as other objects and advantages of the present invention may be more clearly understood by reference to the following detailed description, when considered with the drawings which illustrate particular embodiments of the present invention.

DESCRIPTION OF THE PREFERRED EMBODIMENTS

Figure 1:
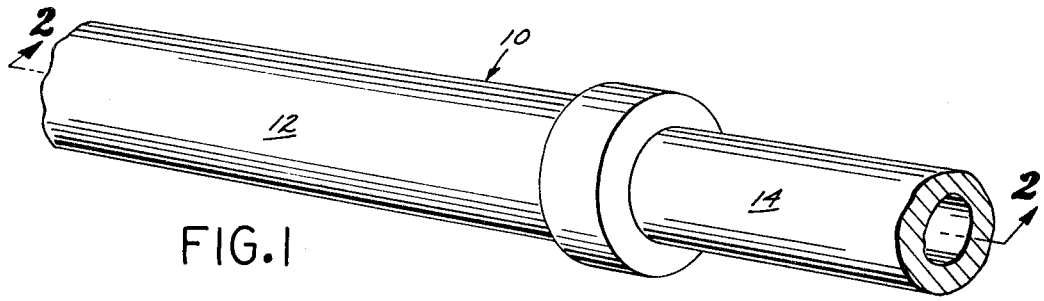
FIG. 1 is a perspective view of a swivel fitting which affords a swiveling action between a pair of fluid conduit portions in accordance with the present invention.
Figure 2:
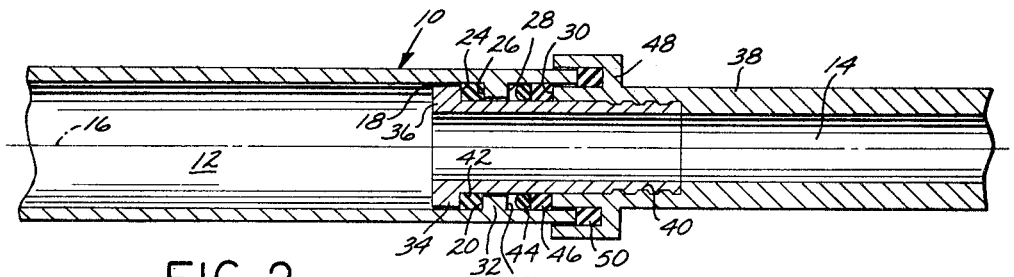
FIG. 2 is a view taken along the line 2—2 of FIG. 1.

Referring now to the drawings, and particularly FIGS. 1 and 2, there is illustrated a swivel fitting 10 according to the present invention which comprises, generally, a pair of longitudinally extending cylindrical or tubular fluid conduit portions 12 and 14 having coaxial, complemental annular surfaces characterized by circumferential movement to one another upon relative swiveling or rotation of the portions 12 and 14 about a longitudinally or axially extending swivel axis 16.

The complemental annular surfaces of the portions 12 and 14 define a generally axially oriented annular fluid leakage path 18 which includes an annular front recess or chamber 20 at the innermost or front extremity, and an annular rear recess or chamber 22 at the outermost or rear extremity of the path 18, as best viewed in FIG. 2.

The front chamber 20 is partly defined by confronting walls 24 and 26 which extend generally transversely of the swivel axis 16 as integral parts of the conduit portions 14 and 12, respectively. The rear chamber 22 similarly is partly defined by confronting walls 28 and 30 which extend generally transversely of the swivel axis 16 and form integral parts of the conduit portions 12 and 14, respectively.

The conduit portions 12 and 14 are intended to be merely representative of the complemental parts, fittings, couplers and the like commonly used in swivel joints for carrying fluids such as hydraulic fluid, air, liquid oxygen or the like. Such complemental parts typically tend to move apart when high pressures are developed within the interior of the swivel fitting 10. In the present invention this causes the walls 24 and 26 to move together in closing relation, while the walls 28 and 30 tend to move apart. Of course, where the pressure differential across the leakage path 18 is produced by a vacuum or lower pressure inside the fitting 10, the relative movements of the walls will be just the opposite. The suitability of the present fitting for vacuum conditions will be discussed in more detail later.

The walls 26 and 28 are conveniently formed by a radially inwardly extending annular flange 32 which forms an integral part of the interior of the conduit portion 12. The wall 24 is defined by a radially outwardly extending annular flange 34 which is integral with the end of an inner conduit section 36. The section 36 telescopically extends within an outer conduit section 38 in coaxial relation, and the sections 36 and 38 together constitute the conduit portion 14.

The sections 36 and 38 are preferably rigidly secured together in fluid tight, sealed relation by internal swaging. However, the relation need not be fluid tight if other sealing means are provided, as will be seen. The swaging of the adjacent surfaces of the sections, as at 40, is provided by forming grooves in the section 38 and forcibly pressing or deforming the section 36 radially outwardly into the circumferential grooves of the section 38. If desired, such a rigid interconnection can be provided by other means, such as by projection welding or by providing the parts with complemental threads (not shown) which are upset or deformed to provide the desired interconnection.

The fluid leakage path 18 is sealed by means which include an annular front or primary bearing seal 42 located in the front chamber 20 and characterized by a generally square cross section. The front seal 42 is preferably made of a low friction material resistant to extrusion or cold flow under pressure, the commercially available forms of polytetrafluoroethylene being excellent for this purpose. However, for certain applications the seal 42 could be made of materials as hard as bearing bronze, for example, since it functions primarily as a bearing and does not have to deform to any great extent to also provide the desired seal. As will be seen, engagement of its opposite faces under high pressure differentials provides such a seal. In any event, some tendency to deform is helpful, but it is very important that the material be capable of bearing loads with minimum frictional resistance to swiveling of the parts which bear against the opposite faces of the seal.

An annular secondary seal or O-ring 44 and a backup ring or rear seal 46 are located in the rear chamber 22. The rear seal 46 is preferably made of a material similar to that of the front seal 42, but the O-ring 44 should be made of a resilient, more yieldable or more easily deformable material, such as buna-N rubber or the like. The O-ring 44 deforms to seal off any leakage across the front seal 42 and also any past the swaged area 40.

The front seal 42 is compressed upon closing movement of the walls of the front chamber 20, and, as previously mentioned, preferably expands radially outwardly and also radially inwardly to engage the adjacent complemental surfaces of the conduit portions 12 and 14. The portions 12 and 14 are formed so that these complemental surfaces are spaced apart very slightly when they are exactly coaxially aligned with the swivel axis 16, that is, with a slight tolerance between them. This alignment is provided by engagement of such complemental surfaces by the radially outwardly and inwardly oriented surfaces of the front seal 42. Consequently, the resistance to relative swiveling movement of the conduit portions 12 and 14 is minimized. However, the primary bearing surfaces of the seal 42 are its opposite faces in engagement with the walls 24 and 26. The frictional resistance in these areas is minimized by reason of the nature of the low-friction material of which the front seal 42 is made.

Since the material of the front seal 42 is relatively stiff, at least compared to the seal 44, a small portion of the fluid within the conduit portions 12 and 14 generally tends to glow or leak past the seal 42, particularly under conditions of low pressure differential across the fluid leakage path 18. This is likewise true of possible fluid leakage past the rear seal 46 under vacuum conditions, as will be seen. However, the more easily deformable rubber of elastomeric material of which the O-ring 44 is made tends to very rapidly deform under such conditions of low pressure differential. This seals the leakage path 18 and permits a pressure differential to build up across the fluid leakage path 18. This differential soon becomes sufficient to "energize" or deform the less resilient material of the seal 42 to effect a sealing action in that area. It is also noted that deformation of the O-ring 44 seals off any leakage past the swaged area 40, as previously indicated.

Although some deformation of the O-ring 44 may continue after the front seal 42 is energized, for all practical purposes the conduit portions 12 and 14 swivel relative to one another primarily upon the opposite faces of the front seal 42. The O-ring 44 and the rear seal 46 do tend, however, to provide better alignment of the adjacent surfaces of the conduit portions 12 and 14 relative to the swivel axis 16. That is, they are in some degree of engagement with the conduit portions 12 and 14 at all times and thereby prevent misalignment.

The swivel fitting 10 is assembled by first telescoping the inner conduit section 36 within the conduit portion 12, with its flange 34 located axially inwardly of the flange 32 of the conduit portion 12 and with the front seal 42 located between the flanges. The O-ring 44 and rear seal 46 are next sleeved or slipped over the outwardly extending extremity of the inner conduit section 36, and the outer conduit section 38 thereafter sleeved over the inner conduit section 36. The mechanical swaging is then accomplished in the area 40 to thereby rigidly secure the sections 36 and 38 together, preferably in fluid-tight relation.

To assure the orientation and spatial relationship of the fitting components, as illustrated in FIG. 2, particularly such that the seals 44 and 46 are not compressed in their static state, an annular flange 48 is provided upon the extremity of the conduit portion 14, and a seal 50 is interposed between the flange 48 and the adjacent end of the conduit portion 12.

The seal 50 is preferably made of the same material as the front seal 42, is characterized by a generally square cross section, and cooperates with the flange 48 to provide a stop or gage to properly locate the components upon assembly of the fitting. Thus, the outer conduit section 38 cannot be inserted too far within the conduit portion 12.

Preferably the flange 48 includes an annular ledge to overlie and "capture" the seal 46, the ledge also being movable over the adjacent end of the conduit section 12 in spaced relation. With this arrangement, when low pressure or vacuum conditions within the swivel fitting 10 deform the O-ring 44 and cause relative axial movement of the portions 12 and 14 toward each other, this tends to compress the seal 50 so that it acts as a bearing and also as a seal to prevent fluid leakage across the path 18.

In operation, it has been found that the swivel fitting 10 is capable of swiveling movement about the axis 16 under relatively high pressure differentials, but with relatively little torque required, easy swiveling being experienced at differentials up to 2000 p.s.i. with air and 6000 p.s.i. with a liquid medium.

Figure 3:
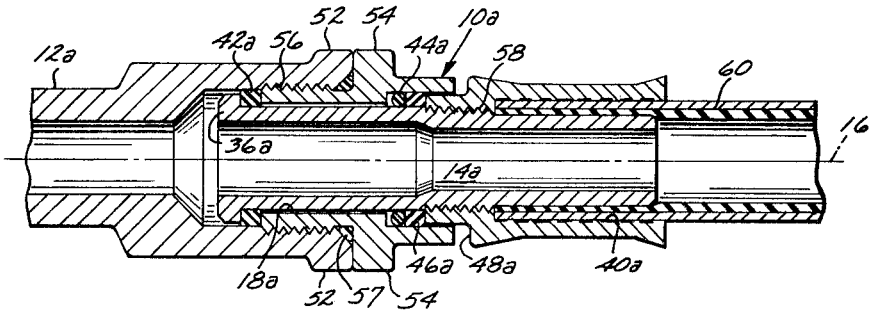
FIG. 3 is a longitudinal sectional view of a hose connection incorporating the present swivel fitting.

The swivel fitting 10a illustrated in FIG. 3 is essentially identical in operation to that of the swivel fitting 10, and for ease of comprehension the parts of the fitting 10a corresponding to the parts of the fitting 10 are identified by the same numeral, but with the subscript a.

Thus, the conduit portion 12a comprises parts 52 and 54 which are complementally threaded together at 56, with a usual O-ring 57 being seated within a suitable space defined by the parts 52 and 54 adjacent the threads 56 to seal the threads 56 against fluid leakage.

The conduit portions 14 also comprise two parts which are threadably secured together, as at 58, with the complemental, axially extending surfaces of the parts being spaced apart to accommodate a braided or flexible hose 60. The inner portion of this two-part arrangement is outwardly rolled or swaged to provide a fluid-tight and firm connection, as indicated generally at 40a, which holds the hose 60 in position.

In operation, when the hose fitting of FIG. 3 is subjected to internal pressure, any initial slight leakage past the front seal 42a causes deformation of the O-ring 44a. This in turn develops a pressure differential across the fluid leakage path 18a and moves the conduit portions 12a and 14a away from each other. This axial movement of the components causes the front seal 42a to radially orient itself and coaxially align the conduit portions 12a and 14a so that they can be rotated on the opposite faces of the front seal 42a with minimum frictional resistance. The rear seal 46a tends to provide alignment as well, as previously indicated in connection with the rear seal 46.

Opposite rotation of the parts 52 and 54 of the conduit portions 12a, as by opposite rotation of flats thereon, disconnects the part 52 from the rest of the swivel fitting 10a. The fitting 10a is thus representative of a disconnectable hose coupling having a swivel capability.

Figure 4:
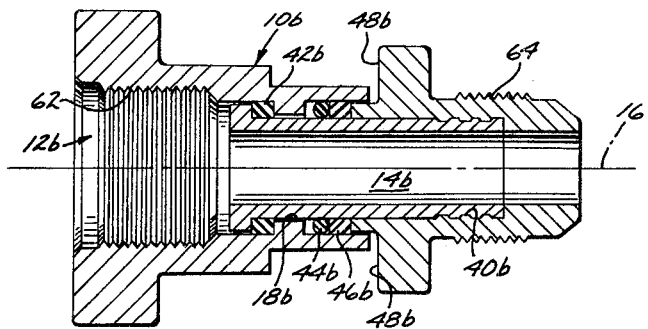
FIG. 4 is a longitudinal sectional view of a union incorporating the present swivel fitting.

Referring now to FIG. 4, a swivel fitting 10b as illustrated which is particularly adapted to function as a pipe or tube union. The fitting 10b is essentially identical to the fitting 10 of FIG. 1 and, consequently, corresponding numerals with the subscript C wil be used to designate the corresponding parts of the respective fittings.

The conduit portion 12b includes internal thread 62 which enables its connection to an externally threaded pipe member (not shown), while the conduit portion 14b includes external thread 64 which enable its connection to a complemental, internally threaded pipe member (not shown), as will be apparent. In other respects, the construction and operation of the fitting 10b is identical to the construction and operation of the fitting 10. That is, the swivel fitting 10b operates in response to pressure differential across the fluid leakage path 18b to axially move the conduit portions 12b and 14b relative to one another. Assuming that the differential results from a pressure within the fitting which is higher than the environmental pressure, the conduit portions 12b and 14b will move away from each other and effect a compression of the front seal 24b. This coaxially aligns the conduit portions and presents the opposite faces of the seal 24b to the conduit portions as a low friction bearing area. Under conditions of low pressure differential, the O-ring 44b "energizes" the front seal 24b, and the backup or rear seal 46a provides axial alignment at the outer extremity of the conduit portion 12b, in addition to its backup function for the O-ring 44b, as previously described.

From the foregoing it will be apparent that a swivel fitting has been provided which utilizes a pair of axially spaced seals to prevent leakage across the leakage path defined between the relatively rotatable portions of the fitting, the seals being further operative under pressure to align the fitting portions and provide a relatively small bearing surface to thereby minimize the frictional resistance to relative rotation. The relatively straightforward design of the various swivel fitting embodiments disclosed enables their manufacture at relatively low cost, and is conducive to long service life with minimum maintenance.

Various changes and modifications of the swivel fitting may occur to those skilled in the art without departing from the spirit of the invention.

I claim:

1. A swivel assembly comprising: first and second conduit portions including complemental surfaces movable relative to one another for rotation of said conduit portions about a swivel axis and also movable axially with respect to one another, said surfaces defining therebetween an annular fluid leakage path including axially spaced apart first and second chambers having confronting wall portions, said confronting wall portions of each chamber being positioned on the first and second conduit portions and extending generally transversely to the swivel axis; and sealing means in said leakage path including an annular primary seal located in said first chamber and engageable by the wall portions of said first chamber upon relative axial movement of said wall portions toward one another to provide bearing surfaces and to prevent substantial fluid leakage past said primary seal, said sealing means further including a secondary seal located in said second chamber and operative in response to fluid leakage past said primary seal to seal said leakage path and prevent escape of said fluid leakage past said secondary seal and allows a pressure differential to be developed across said leakage path which energizes said primary seal to prevent fluid leakage past said primary seal, the surfaces of said first and second chambers constraining said sealing means against radial extrusion thereof on development of a pressure differential across said leakage path.

2. A swivel assembly according to claim 1 wherein said primary seal is made of a relatively low friction bearing material, and said secondary seal is more easily deformable compared to said primary seal whereby said secondary seal is responsive to a lower pressure differential than said primary seal.

3. A swivel assembly according to claim 1 wherein said primary seal is made of tetrafluoroethylene material.

4. A swivel assembly according to claim 1 wherein said confronting wall portions of said first chamber are located adjacent the interior extremity of said fluid leakage path and are oriented for movement toward one another upon axial movement of said conduit portions away from one another.

5. A swivel assembly according to claim 1 wherein said confronting wall portions of said second chamber are located adjacent the exterior extremity of said fluid leakage path and are oriented for movement away from one another upon axial movement of said conduit portions away from one another.

6. A swivel assembly according to claim 1 wherein said confronting wall portions of said first chamber are located adjacent the exterior extremity of said fluid leakage path and are oriented for movement toward one another upon axial movement of said conduit portions toward one another.

7. A swivel assembly according to claim 1 wherein portions of said complemental surfaces are coaxially alignable relative to a predetermined swivel axis, and wherein said portions are engageable by said primary seal, upon development of said pressure differential, to effect said coaxial alignment.

8. A swivel assembly according to claim 1 wherein said first conduit portion includes a pair of readily disconnectable sections, one of said sections including one of said confronting wall portions defining said first chamber.

9. A swivel assembly according to claim 1 wherein said secondary seal is an O-ring, and wherein said sealing means further includes a backup ring in said second chamber adjacent said O-ring.

References Cited

UNITED STATES PATENTS

| | | | |
|---|---|---|---|
| 961,170 | 6/1910 | Shotwell | 285—281 |
| 1,538,007 | 5/1925 | Schellin | 277—58 |
| 1,996,899 | 4/1935 | Buckner | 285—278 X |
| 2,190,419 | 2/1940 | Evarts | 285—351 X |
| 2,323,701 | 7/1943 | Barksdale | 285—280 X |
| 2,450,581 | 10/1948 | Couty | 285—280 X |
| 2,560,263 | 7/1951 | Wiegand et al. | 285—351 X |
| 2,587,170 | 2/1952 | Klingler et al. | 285—279 |
| 3,346,276 | 10/1967 | Snyder | 285—187 X |

FOREIGN PATENTS 19,306    1904    Great Britain.

THOMAS F. CALLAGHAN, Primary Examiner

U.S. Cl. X.R.

277—58; 285—351